United States Patent
Croussore et al.

(10) Patent No.: US 9,941,994 B2
(45) Date of Patent: Apr. 10, 2018

(54) WAVELENGTH SHIFT ELIMINATION DURING SPECTRAL INVERSION IN OPTICAL NETWORKS

(71) Applicant: Fujitsu Limited, Kawasaki-shi, Kanagawa (JP)

(72) Inventors: Kevin Croussore, Milipitas, CA (US); Inwoong Kim, Allen, TX (US); Olga I. Vassilieva, Plano, TX (US); Takao Naito, Musashino (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/928,896

(22) Filed: Oct. 30, 2015

(65) Prior Publication Data

US 2017/0126353 A1      May 4, 2017

(51) Int. Cl.
| | |
|---|---|
| *H04B 10/12* | (2006.01) |
| *H04B 10/00* | (2013.01) |
| *H04J 14/06* | (2006.01) |
| *H04B 10/291* | (2013.01) |
| *H04B 10/61* | (2013.01) |

(52) U.S. Cl.
CPC ............ *H04J 14/06* (2013.01); *H04B 10/291* (2013.01); *H04B 10/6161* (2013.01); *H04B 10/6162* (2013.01); *H04B 10/2912* (2013.01)

(58) Field of Classification Search
None
See application file for complete search history.

(56) References Cited

U.S. PATENT DOCUMENTS

| | | | | |
|---|---|---|---|---|
| 6,529,314 | B1* | 3/2003 | Shukunami | G02F 1/3536 359/332 |
| 7,164,526 | B2* | 1/2007 | McKinstrie | G02F 1/395 330/4.5 |
| 2006/0285197 | A1* | 12/2006 | McKinstrie | H01S 3/06758 359/333 |
| 2008/0158656 | A1* | 7/2008 | McKinstrie | G02F 1/3536 359/330 |
| 2010/0221014 | A1* | 9/2010 | Watanabe | H04B 10/299 398/81 |
| 2011/0176202 | A1* | 7/2011 | Kato | G02F 1/395 359/337.5 |
| 2013/0208334 | A1* | 8/2013 | Kakande | H04B 10/291 359/246 |

(Continued)

OTHER PUBLICATIONS

Wabnitz et al., All-Optical Signal Processing: Data Communication and Storage Applications, Apr. 2015, pp. 187-190.*

(Continued)

*Primary Examiner* — Ken N Vanderpuye
*Assistant Examiner* — Jai Lee
(74) *Attorney, Agent, or Firm* — Baker Botts L.L.P.

(57) ABSTRACT

Methods and systems are provided for wavelength shift elimination during spectral inversion in optical networks. The method includes receiving an input optical signal, and generating a combined optical signal by combining, by Bragg scattering, the input optical signal having an input wavelength with a first pump signal having a first wavelength. The method further includes converting the combined optical signal into an output optical signal, by phase-conjugation, using a second pump signal having a second wavelength. The output optical signal has the same wavelength as the input optical signal.

9 Claims, 8 Drawing Sheets

(56) References Cited

U.S. PATENT DOCUMENTS

2013/0272702 A1* 10/2013 Yang .................. H04B 10/2912
398/48

OTHER PUBLICATIONS

Lim et al., "Polarization-Independent, Wavelength-Shift-Free Optical Phase Conjugator Using a Nonlinear Fiber Sagnac Interferometer," IEEE Photonics Technology Letters, vol. 11, No. 5; 3 pages., May 1999.

Jansen et al., "Reduction of nonlinear phase noise by mid-link spectral inversion in a DPSK based transmission system," Optical Society of America, OCIS codes: (060.2330) Fiber optics communications; (070.5040) Phase conjugation; 3 pages., 2005.

Fok et al., "Polarization-Insensitive Wavelength Conversion of DPSK Signal Using Four-Wave Mixing in 32-cm Bismuth-Oxide Highly Nonlinear Fiber," Optical Society of America, OCIS codes: (190.4370) Nonlinear optics, fibers, (190.4380) Nonlinear optics, four-wave mixing, (190.2620) Frequency conversion; 2 pages., 2007.

Woods et al., "Reduction of Cross-Phase Modulation-Induced Impairments in Long-Haul WDM Telecommunication Systems Via Spectral Inversion," IEEE Photonics Technology Letters, vol. 16, No. 2; 3 pages., Feb. 2004.

Jansen et al., "Long-Haul DWDM Transmission Systems Employing Optical Phase Conjugation," IEEE Journal of Selected Topics in Quantum Electronics, vol. 12, No. 4; 5 pages., Jul. 2006.

* cited by examiner

WAVELENGTH SHIFT ELIMINATION DURING SPECTRAL INVERSION IN OPTICAL NETWORKS

TECHNICAL FIELD OF THE INVENTION

The present disclosure relates generally to optical communication networks and, more particularly, to wavelength shift elimination during spectral inversion in optical networks.

BACKGROUND

Telecommunications systems, cable television systems and data communication networks use optical networks to rapidly convey large amounts of information between remote points. In an optical network, information is conveyed in the form of optical signals through optical fibers. Optical networks may also include various subsystems, such as amplifiers, dispersion compensators, multiplexer/demultiplexer filters, wavelength selective switches, spectral inverters, couplers, etc. configured to perform various operations within the network.

The distance that an optical signal can be transmitted with optical amplifiers for a given data rate depends on the impairments in the transmission system. Impairments can include accumulated amplified spontaneous emission (ASE) noise, chromatic dispersion (CD), nonlinear optical effects (such as nonlinear phase noise), polarization mode dispersion, and polarization dependent loss. Digital signal processing (DSP) in coherent optical receivers may compensate for linear impairments such as CD, polarization mode dispersion and polarization dependent loss effectively. Intrachannel nonlinear impairment may also be compensated using digital back propagation in a coherent optical receiver with DSP, but it requires high computation power, which increases with optical signal bandwidth. Typically, the higher the data rate and the denser the wavelength spacing, the more susceptible the transmission system is to impairments.

Dispersion compensation in an optical system may be accomplished using dispersion compensating fiber, dispersive filters (such as, Bragg grating or etalons) or in software using digital signal processing. Additionally, nonlinear phase noise (NLPN) may be mitigated by mid-span spectral inversion when the optical signal is transmitted across multiple spans. Mid-span spectral inversion may be achieved optically (e.g., optical phase conjugation based on optical parametric process) or electronically (e.g., Optical-Electrical-Optical (O-E-O)). However, when performing spectral inversion, the wavelength of the signal shifts. As such, current techniques can not compensate higher than first order dispersion and also introduce wavelength planning requirements due to the wavelength shift.

SUMMARY

In particular embodiments, a method for processing an optical signal includes receiving an input optical signal, and generating a combined optical signal by combining, by Bragg scattering, the input optical signal having an input wavelength with a first pump signal having a first wavelength. The method further includes converting the combined optical signal into an output optical signal, by phase-conjugation, using a second pump signal having a second wavelength. The output optical signal has the same wavelength as the input optical signal.

In another embodiment, a method for processing an optical signal includes receiving an input optical signal, and generating a combined optical signal by combining, by phase-conjugation, the input optical signal having an input wavelength with a first pump signal having a first wavelength. The method further includes converting the combined optical signal into an output optical signal, by Bragg scattering, using a second pump signal having a second wavelength. The output optical signal has the same wavelength as the input optical signal.

In another embodiment, an optical network system for processing an optical signal that includes a transmitter and a receiver coupled to receive a signal transmitted by the transmitter. The system further includes a transmission path coupling the transmitter and the receiver. The transmission path includes a first node configured to receive an input optical signal, generate a combined optical signal by combining, by Bragg scattering, the input optical signal having an input wavelength with a first pump signal having a first wavelength, and convert the combined optical signal into an output optical signal, by phase-conjugation, using a second pump signal having a second wavelength. The output optical signal has the same wavelength as the input optical signal.

In another embodiment, an optical network system for processing an optical signal includes a transmitter and a receiver coupled to receive a signal transmitted by the transmitter. The system further includes a transmission path coupling the transmitter and the receiver. The transmission path includes a first node configured to receive an input optical signal, generate a combined optical signal by combining, by phase-conjugation, the input optical signal having an input wavelength with a first pump signal having a first wavelength, and convert the combined optical signal into an output optical signal, by Bragg scattering, using a second pump signal having a second wavelength. The output optical signal has the same wavelength as the input optical signal.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
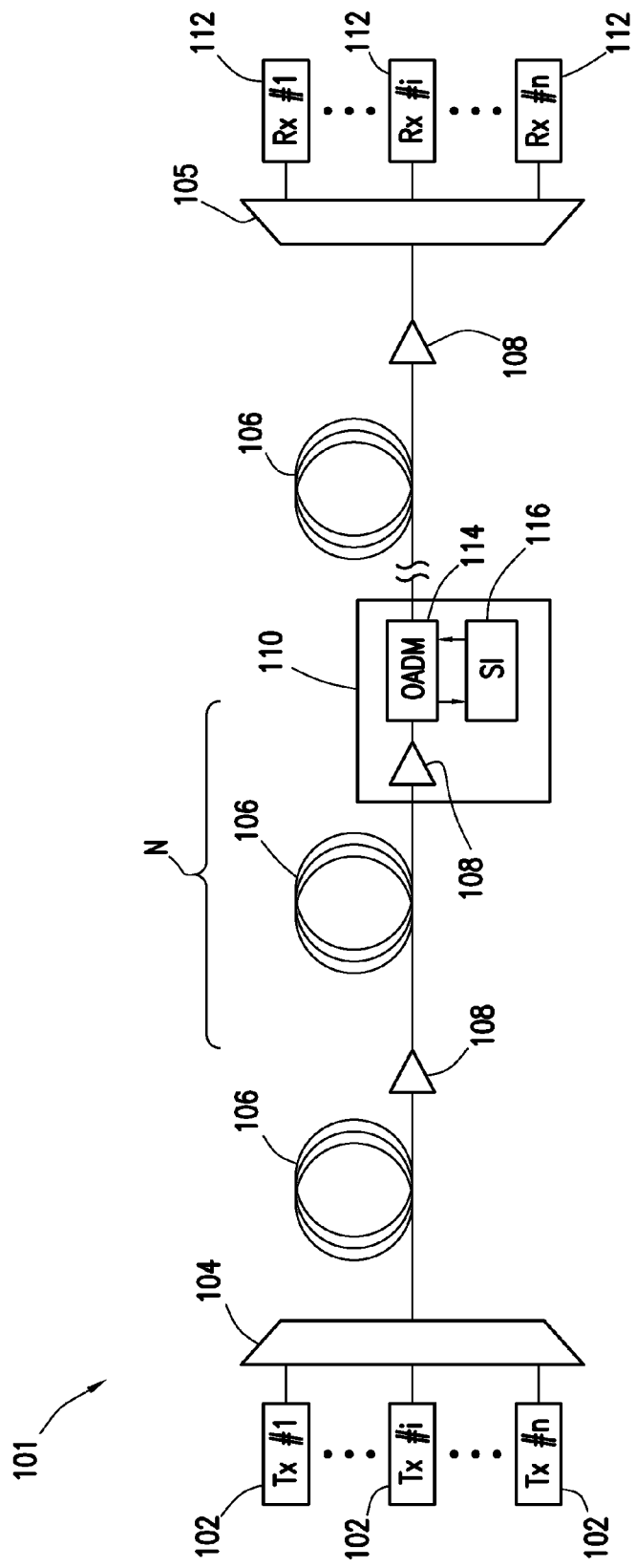
FIG. 1 illustrates a block diagram of an example optical network in accordance with one embodiment of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates a block diagram of an example optical network 101 in accordance with one embodiment of the present disclosure. In certain embodiments, optical network 101 may be any network utilized for telecommunications, data communications, and/or any other suitable function. Although FIG. 1 illustrates a particular embodiment and configuration of optical network 101, other suitable types of optical networks may be utilized. Optical network 101 may be a point-to-point optical network with terminal nodes, a ring optical network, a mesh optical network, or any other suitable optical network or combination of optical networks. In certain embodiments, optical network 101 may include a number of optical channels that are carried over a common path at different wavelengths. To increase the information carrying capabilities of optical network 101, multiple signals transmitted at multiple channels may be combined into a single optical signal. Optical network 100 may represent all or a portion of a metropolitan network, a long-haul network, or any other suitable network or combination of networks.

As shown, optical network 101 may depict elements that carry user data and comprise network equipment. Accordingly, optical network 101 may include one or more optical fibers 106 configured to transport one or more optical signals communicated by components of optical network 101. The network elements of optical network 101, coupled together by optical fibers 106, may comprise one or more transmitters 102, one or more multiplexers (MUX) 104, one or more nodes 110, one or more amplifiers 108, one or more demultiplexers 105, and one or more receivers 112.

Optical fibers 106 may comprise thin strands of glass capable of communicating the signals over long distances with very low loss. Optical fibers 106 may be any suitable type of fiber, such as a Single-Mode Fiber (SMF), Enhanced Large Effective Area Fiber (ELEAF), or a TrueWave® Reduced Slope (TW-RS) fiber. Optical fibers 106 may include periodic segments of dispersion compensating fiber (DCF), which has the opposite dispersion sense as fiber used for transmission and can compensate for multiple wavelengths simultaneously. Optical fibers 106 may include multiple spans or segments. For example, a section of optical fiber 106 may be composed of N spans. Spans may be separated by nodes 110, amplifiers 108, or any other suitable equipment.

Optical network 101 may include devices configured to transmit optical signals over optical fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network. Multiplexer 104 may be coupled to transmitters 102 and may be any system, apparatus or device configured to combine the signals transmitted by transmitters 102, in individual wavelengths, into a single WDM or DWDM signal. In some embodiments, transmitters 102 and/or multiplexer 104 may be configured within one or more nodes 110.

Amplifiers 108 may amplify the multi-channeled signals within optical network 101. Amplifiers 108 may be positioned before and/or after certain lengths of optical fibers 106 or within nodes 110. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied in the form of one or more pump signals to excite the atoms of the doped portion of the optical fiber, which increases the intensity of the optical signal. As an example, amplifiers 108 may comprise an erbium-doped fiber amplifier (EDFA). In various embodiments, other suitable amplifiers, such as a semiconductor optical amplifier (SOA), may be used.

One or more nodes 110 may be coupled to optical network 101 via optical fibers 106 also. Node 110 may include various types of equipment including optical add/drop multiplexers (OADMs) 114, amplifiers 108, spectral inverters (SIs) 116, or any other suitable equipment. A signal may reach node 110 after traversing a number of spans, such as N spans. After passing through node 110, a signal may travel along optical fibers 106 directly to a destination, or the signal may be passed through one or more additional nodes 110 and/or amplifiers 108 before reaching a destination. In some embodiments, at OADM 114, an optical signal may be dropped for spectral inversion to SI 116 and added after SI 116. Further, additional components, such as an additional amplifier 108 (not expressly shown), may be utilized in the transmission path after SI 116 for the optical signal to have sufficient optical fiber launching power based on the configuration and output power from SI 116.

Optical network 101 may also include one or more demultiplexers 105 at one or more destinations of optical network 101. Demultiplexer 105 may comprise any system apparatus or device that may act as a demultiplexer by splitting a single WDM signal into its individual channels. For example, optical network 101 may transmit and carry a forty channel DWDM signal. Demultiplexer 105 may divide the single, forty channel DWDM signal into forty separate signals according to the forty different channels.

Optical network 101 may also include receivers 112 coupled to demultiplexer 105. Each receiver 112 may be configured to receive signals transmitted in a particular wavelength or channel, and process the signals for the information that they contain. Accordingly, optical network 101 may include at least one receiver 112 for every channel of the network.

As used herein, "traffic" means information transmitted, stored, or sorted in the network. Such traffic may comprise optical signals having at least one characteristic modulated to encode audio, video, textual, real-time, non-real-time and/or other suitable data. Additionally, the information carried by this traffic may be structured in any suitable manner. Optical network 101 may be configured to communicate traffic structured in the form of optical frames, as packets, or in any other appropriate manner.

Optical networks, such as optical network 101, may further employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). In PSK, the information carried by the optical signal may be conveyed by modulating the phase of a reference signal, also known as a carrier wave, or simple, a carrier. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or 0 and $\pi$) on the constellation diagram; or quadrature PSK (QPSK, 4-PSK, or 4-QAM) using four phases at 0°, 90°, 180°, and 270° (or 0, $\pi/2$, $\pi$, and $3\pi/2$). Phases in such signals may be offset. This may be extended, for example, up to 16-QAM, using sixteen phases. These various signals (for example, 2-PSK or 16-QAM) may be arranged in one circle on the constellation diagram. M-PSK signals may also be polarized using techniques such as dual-polarization QPSK (DP-QPSK) or polarization multiplexed QPSK, wherein separate m-PSK signals are multiplexed by orthogonally polarizing the signals. Advanced modulation techniques enable higher data rates and improved compensation for optical impairments.

The distance that an optical signal can be transmitted for a given data rate depends on the impairments in the transmission system. Impairments can include loss, chromatic dispersion (CD), nonlinear (NL) optical effects (such as nonlinear phase noise (NLPN)), polarization mode dispersion (PMD), polarization dependent loss (PDL), amplified spontaneous emission (ASE) and/or other impairments may affect optical signals within the optical signal transmission path. Advanced modulation format for higher spectral efficiency may require a higher optical signal-to-noise ratio (OSNR). As an example, 16-QAM may need higher OSNR than QPSK for the same bit error rate (BER) performance or quality factor (Q-factor). OSNR directly relates to distances optical signals can travel before requiring regeneration, also called optical reach. Regeneration may involve electrically regenerating the optical signal using optical-electrical-optical (O-E-O) regenerators, referred to herein as "regenerators." Thus, higher order modulation formats, such as 16-QAM, may have lower optical reach than QSPK formats. Additionally, the BER in an optical transmission system may be set by the OSNR, thus the estimated OSNR may be used to predict BER. The OSNR may indicate the instantaneous quality of a signal. As a signal passes through a network, it may lose signal strength or may increase in noise, resulting in a decrease of the overall OSNR. If OSNR drops below a certain point, the signal may be unreadable at a desired destination. Additionally, BER in a transmission is the percentage of bits that have errors relative to the total number of bits transmitted.

NL optical effects may increase with increasing optical power in each optical wavelength. A signal may also be impacted by NLPN. NLPN accumulates span after span and can result from intra- and inter-channel nonlinearities such as self-phase modulation (SPM) and cross phase modulation (XPM) that convert amplitude noise to phase noise. SPM occurs when the amplitude of a signal modulates the refractive index of the optical fiber and imposes as a phase modulation on the signal itself, e.g., SPM introduces a chirp on the signal. SPM further is based on the nonlinearity of the fiber and the CD. XPM occurs when the amplitude modulation of a signal imposes a phase modulation on another signal, typically on another wavelength or on another optical polarization. SPM and XPM may cause severe distortion on transmitted data. An NLPN penalty threshold may be set or calculated for transmission between a particular transmitter and receiver.

Multiple method and techniques may be utilized to compensate for impairments in the transmission system. Loss may be addressed by using amplifiers 108 in the transmission system. Improvements in OSNR may be made by increasing launching power, however, this may also increase NLPN. Further, digital back-propagation (DBP), which mitigates NLPN penalty, may require increased computation power at receiver 112 that may not be available or feasible. Coherent receivers may compensate for CD.

NLPN, especially SPM, may be compensated using digital back propagation (DBP). However, DBP may necessitate high computation power that increases with signal bandwidth. Optical phase conjugation (OPC) is a technique for generating a complex conjugate signal of an input optical signal. The optical spectrum of a phase conjugated signal is inverted.

SIs 116 use nonlinear optics or O-E-O to generate a phase conjugated signal or inverted optical spectrum of the optical signal. Depending on the configuration of SI 116, the optical carrier frequency may be shifted. After inversion, the signal impairment due to dispersion and nonlinearity in a fiber is compensated as the signal propagates along a remaining fiber having similar dispersion and nonlinear properties. For example, dispersion compensation can be achieved with mid-link spectral inversion using OPC. This technique is most useful in systems that are symmetric, for example, the fiber properties of the first half of the link are nearly identical to those of the second half. In this situation, CD is maximized at the center of the link and approaches zero at the receiver side. In such systems it is also possible to compensate intra-channel nonlinear effects such as SPM, when the optical power is properly managed.

Figure 2:
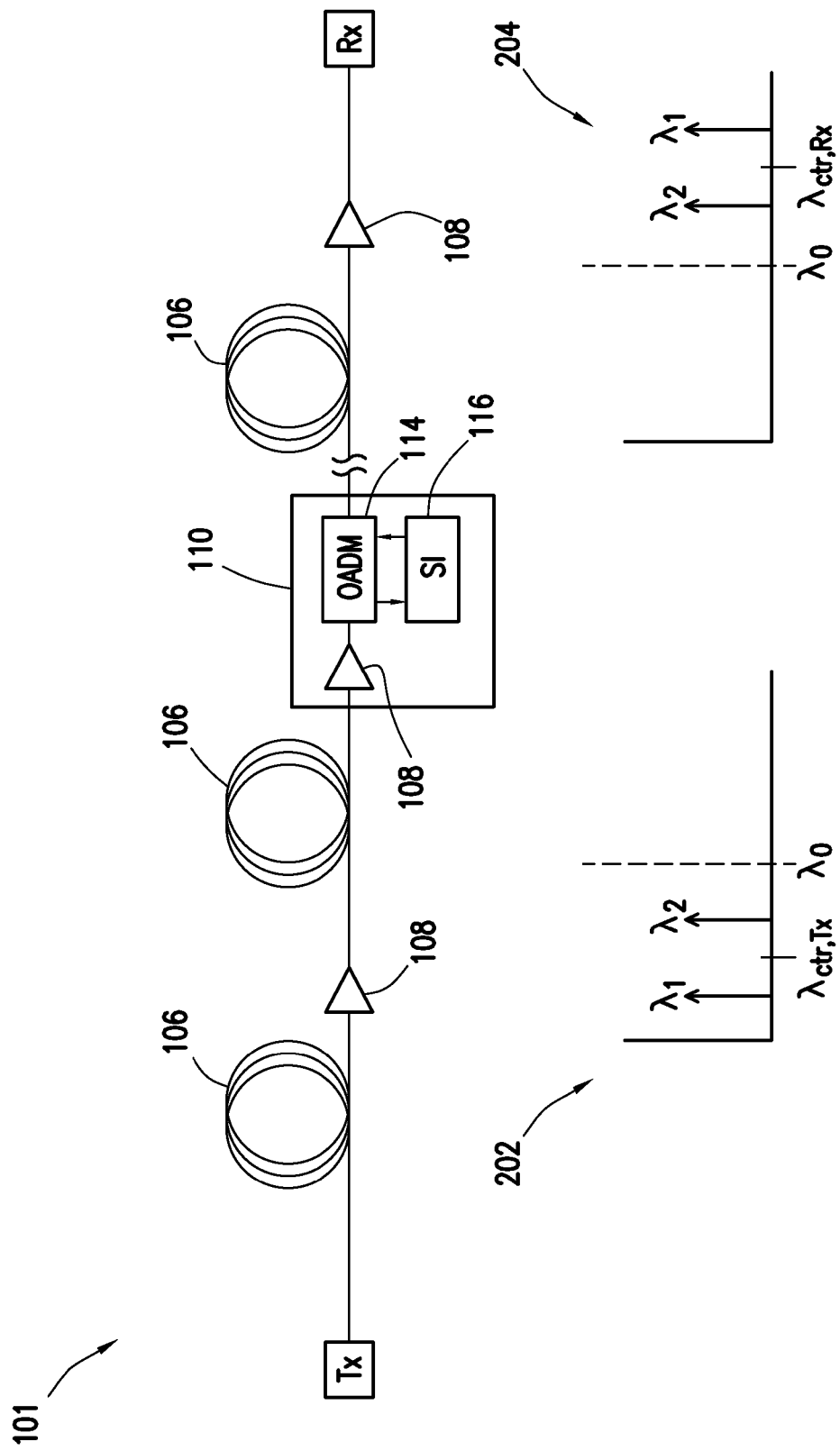
FIG. 2 illustrates a wavelength shift in example optical network in accordance with one embodiment of the present disclosure.

The use of OPC-based SI changes the signal wavelength because of an innate wavelength shift. Moreover, due to conversion efficiency requirements and optical filtering constraints, it may be difficult to minimize the wavelength shift. FIG. 2 illustrates a wavelength shift in example optical network 101 in accordance with one embodiment of the present disclosure. Graph 202 illustrates the wavelength spectrum before spectral inversion from the transmitter. Graph 204 illustrates the wavelength spectrum after spectral inversion transmitted to the receiver. Edges of each wavelength spectrum ($\lambda_1$ and $\lambda_2$) and the center of each wavelength spectrum ($\lambda_{ctr,Tx}$ and $\lambda_{ctr,Rx}$) are illustrated in each of graph 202 and 204. As can be seen in FIG. 2, spectral inversion causes a wavelength shift from graph 202 to graph 204 that may be symmetric around a pump wavelength ($\lambda_0$). In some cases, wavelength management is utilized to account for the shift in the signal wavelength. For example, the dispersion in a fiber may change as a function of the wavelength. In some cases, the pump wavelength ($\lambda_0$) may be closer to the center of the transmitter wavelength spectrum ($\lambda_{ctr,Tx}$) in an attempt to minimize the wavelength shift. However, if the pump wavelength ($\lambda_0$) is close to the center of the transmitter wavelength spectrum ($\lambda_{ctr,Tx}$), it may be difficult to separate the phase conjugated output signal (e.g., $\lambda_{ctr,Rx}$) from the input signal (e.g., $\lambda_{ctr,Tx}$).

In some embodiments, wavelength shift may be reduced or eliminated through the use of two four-wave mixing (FWM) processes. Output of the FWM processes is the phase conjugate of the input wave at the same optical frequency as the input wave. In certain embodiments, spectral inversion may be utilized without shifting the wavelength symmetrically around the pump wavelength ($\lambda_0$).

Figure 3:
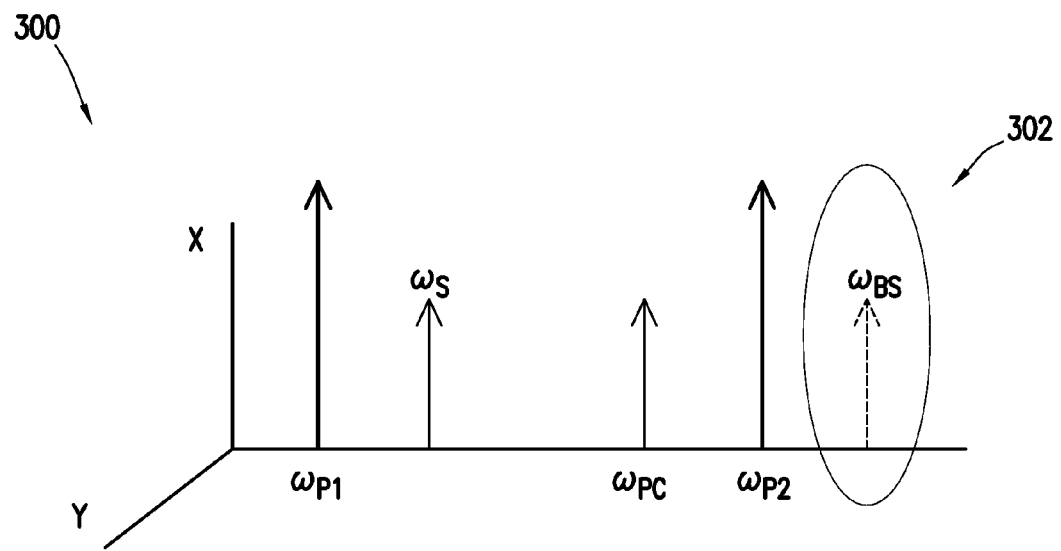
FIG. 3 illustrates a two-stage spectral inversion system including a first stage based on Bragg-scattering, a second stage based on phase conjugation, and three pump signals in accordance with one embodiment of the present disclosure.
Figure 3:
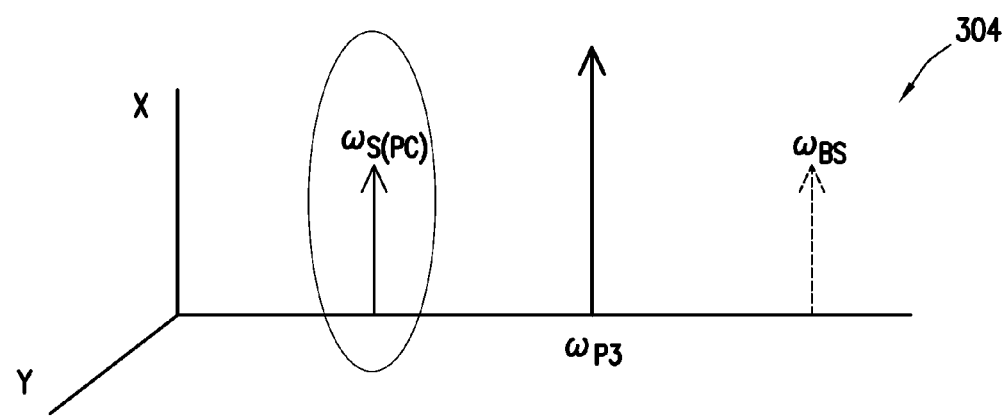

FIG. 3 illustrates two-stage spectral inversion system 300 including first stage 302 based on Bragg-scattering, second stage 304 based on phase conjugation, and three pump signals in accordance with one embodiment of the present disclosure. In some embodiments, using two-stage spectral inversion system 300 may generate an output that is free of a wavelength shift, e.g., a wavelength-shift-free output. Two-stage spectral inversion system 300 includes first stage 302 and second stage 304. First stage 302 performs wavelength conversion without phase conjugation. Second stage 304 uses phase conjugation to shift the output angular frequency from first stage 302 to the input angular frequency. First and second stages 302 and 304 include a FWM process that takes place within one node, such as node 110 discussed with reference to FIGS. 1 and 2, which may be a nonlinear optical element (NLE). Use of two stages allows the reduction or elimination of the wavelength shift associated with spectral inversion, and also allows mid-link spectral inversion methods to compensate for first and second order CD. Additionally, in some embodiments, reducing or eliminating the wavelength shift may allow for polarization-insensitive operation.

First stage 302 includes three input waves with three angular frequencies: input signal ($\omega_s$), pump one ($\omega_{P1}$), and pump two ($\omega_{P2}$). The three input waves are converted using nonlinear frequency conversion, also referred to as Bragg-scattering, and the Bragg-scattering wave with angular frequency, $\omega_{BS}$, and a phase conjugated wave, $\omega_{PC}$, are the outputs. The Bragg-scattering wave is a frequency-shifted copy of the input signal and it is not phase conjugated. The Bragg-scattering wave $\omega_{BS}$ can be chosen by optical bandpass filter for the input signal at the second stage. Second stage 304 has as input the Bragg-scattering wave $\omega_{BS}$ and includes pump three ($\omega_{P3}$) that may perform phase conjugation. The frequency placement for pump three may be adjusted so that the angular frequency of the output wave $\omega_{s(PC)}$ is the same as the angular frequency of the original input signal ($\omega_s$). Additional optical bandpass filter following the second stage can select the output signal of wavelength-shift-free SI at $\omega_s$. Thus, in the current example, with the use of three pump signals, the wavelength shift from spectral inversion of a signal may be eliminated. In the example of FIG. 3, the following set of equations may be followed:

First stage: $\omega_s - \omega_{P1} = \omega_{BS} - \omega_{P2}$;

Second stage: $2\omega_{P3} = \omega_{s(PC)} + \omega_{BS}$;

$$\omega_s = \omega_{s(PC)}. \quad (1)$$

Although two stage spectral inversion system 300 is illustrated based only on single polarization (x-axis), in some embodiments, two stage spectral inversion system 300 may be utilized with dual-polarization or polarization multiplex signals. Additionally, although discussed in a particular order of first stage 302 and second stage 304, the order of the two stages may be reversed. Further, although shown with two pump signals in first stage 302 and one pump signal in second stage 304, any number of pump signals may be utilized in either stage.

Figure 4:
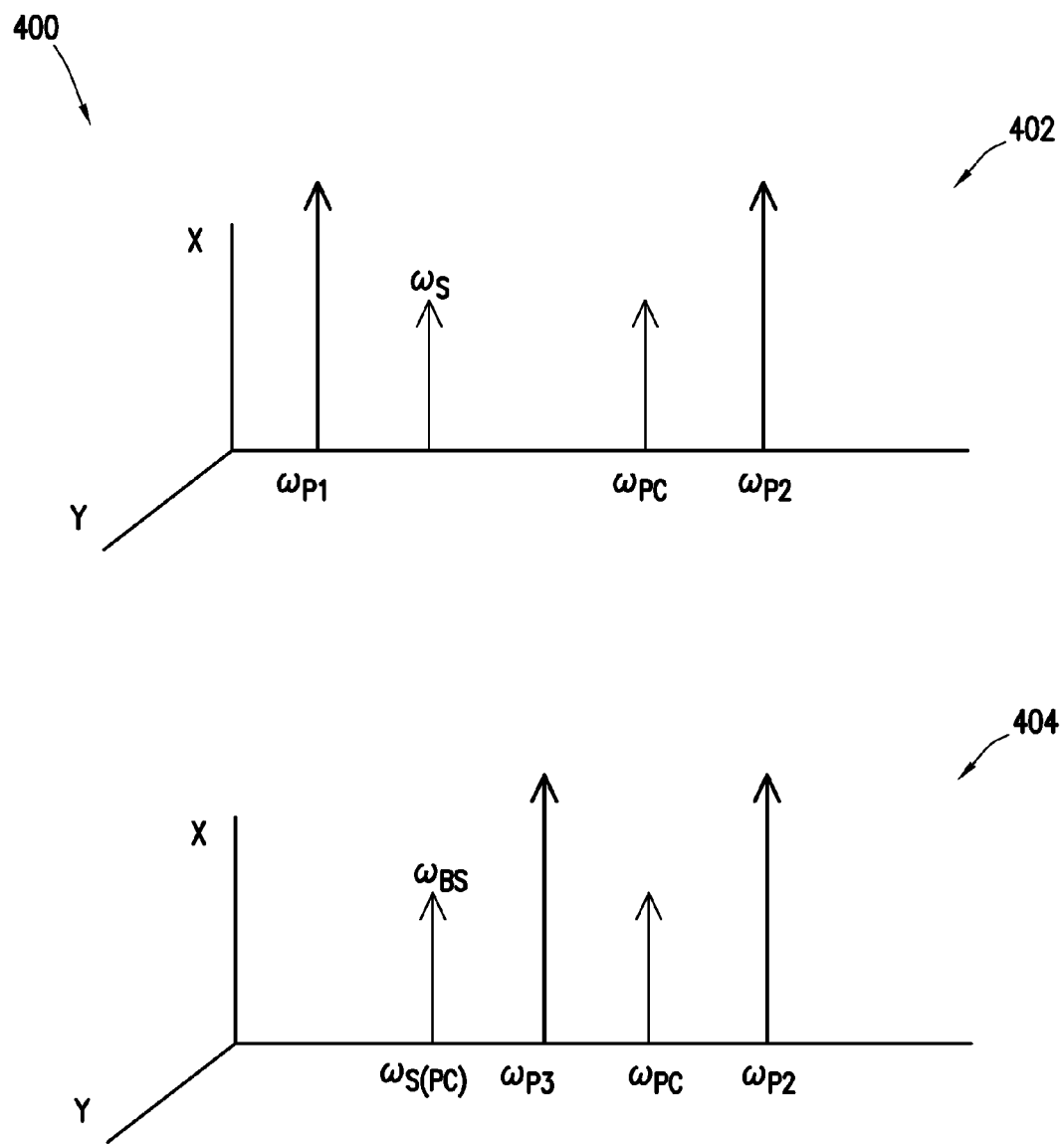
FIG. 4 illustrates a two-stage spectral inversion system including a first stage based on phase conjugation, a second stage based on Bragg-scattering, and four pump signals in accordance with one embodiment of the present disclosure.

FIG. 4 illustrates two-stage spectral inversion system 400 including first stage 402 based on phase conjugation, second stage 404 based on Bragg-scattering, and four pump signals in accordance with one embodiment of the present disclosure. Two-stage spectral inversion system 400 includes first stage 402 and second stage 404. In the example of FIG. 4, first stage 402 uses phase conjugation, while second stage 404 uses Bragg-scattering. First and second stages 402 and 404 include a FWM process that takes place within one node, such as node 110 discussed with reference to FIGS. 1 and 2, which may be a NLE.

First stage 402 includes three input waves with three angular frequencies: input signal ($\omega_s$), pump one ($\omega_{P1}$), and pump two ($\omega_{P2}$). The three input waves are used to generate phase conjugated signal, $\omega_{PC}$. The phase conjugated signal, $\omega_{PC}$ can be chosen by optical bandpass filter for the input signal at the second stage. Second stage 404 has as input the phase conjugated wave $\omega_{PC}$ is converted using Bragg-scattering and signals from pump three ($\omega_{P3}$) and a second signal from pump two ($\omega_{P2}$). The output wave is the Bragg-scattering wave with angular frequency, $\omega_{BS}$, that is the same as the angular frequency of the original input signal ($\omega_s$) shown by $\omega_{s(PC)}$. Additional optical bandpass filter following the second stage can select the output signal of wavelength-shift-free SI at $\omega_s$. Thus, in the current example, with the use of four pump signals, including two signals from pump two, the wavelength shift from spectral inversion of a signal may be eliminated. In the example of FIG. 4, the following set of equations may be followed:

First stage: $\omega_s - \omega_{P1} = \omega_{P2} - \omega_{PC}$;

Second stage: $\omega_{P3} - \omega_{BS} = \omega_{P2} - \omega_{PC}$;

$$\omega_s = \omega_{s(PC)} = \omega_{BS}. \quad (2)$$

Figure 5:
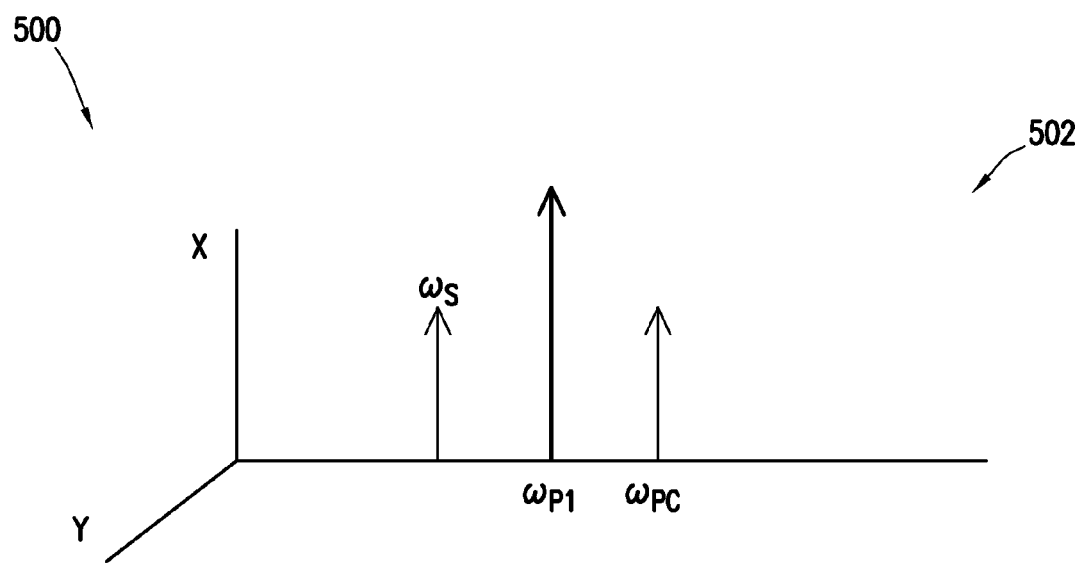
FIG. 5 illustrates a two-stage spectral inversion system including a first stage 502 based on phase conjugation, a second stage based on Bragg-scattering, and three pump signals in accordance with one embodiment of the present disclosure.
Figure 5:
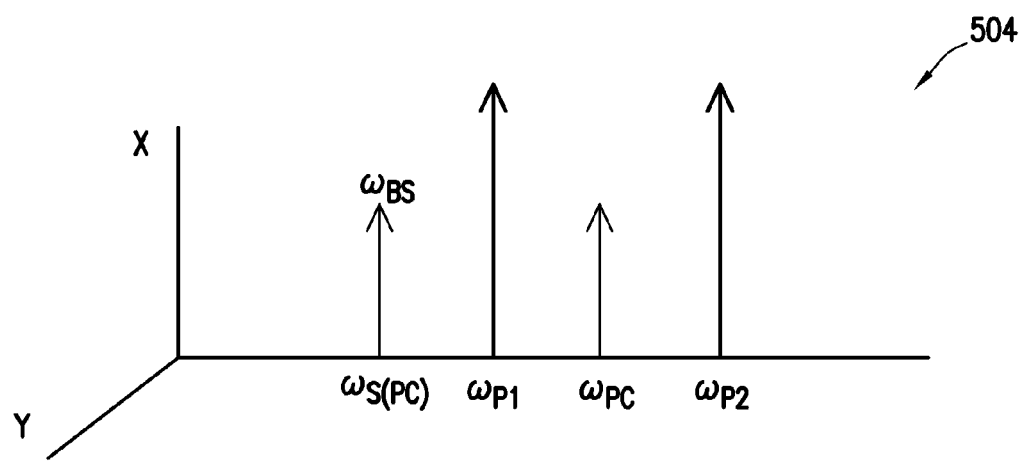

FIG. 5 illustrates two-stage spectral inversion system 500 including first stage 502 based on phase conjugation, second stage 504 based on Bragg-scattering, and three pump signals in accordance with one embodiment of the present disclosure. Two-stage spectral inversion system 500 includes first stage 502 and second stage 504. In the example of FIG. 5, first stage 502 uses phase conjugation and includes one pump signal, while second stage 504 uses Bragg-scattering and includes two pump signals. First and second stages 502 and 504 include a FWM process that takes place within one node, such as node 110 discussed with reference to FIGS. 1 and 2, which may be a NLE.

First stage 502 includes two input waves with two angular frequencies: input signal ($\omega_s$) and pump one ($\omega_{P1}$). The two input waves are used to generate phase conjugated wave, $\omega_{PC}$. The phase conjugated signal, $\omega_{PC}$ can be chosen by optical bandpass filter for the input signal at the second stage. Second stage 504 has as input the phase conjugated wave $\omega_{PC}$ that is converted using Bragg-scattering and signals from pump two ($\omega_{P2}$) and a second signal from pump one ($\omega_{P1}$). The output wave is the Bragg-scattering wave with angular frequency, $\omega_{BS}$, that is the same as the angular frequency of the original input signal ($\omega_s$) shown by $\omega_{s(PC)}$. Additional optical bandpass filter following the second stage can select the output signal of wavelength-shift-free SI at $\omega_s$. Thus, in the current example, with the use of three pump signals, the wavelength shift from spectral inversion of a signal may be eliminated. In the example of FIG. 5, the following set of equations may be followed:

First stage: $2\omega_{P1} = \omega_s + \omega_{PC}$;

Second stage: $\omega_{P1} - \omega_{BS} = \omega_{P2} - \omega_{PC}$;

$$\omega_s = \omega_{s(PC)} = \omega_{BS}. \quad (3)$$

Figure 6:
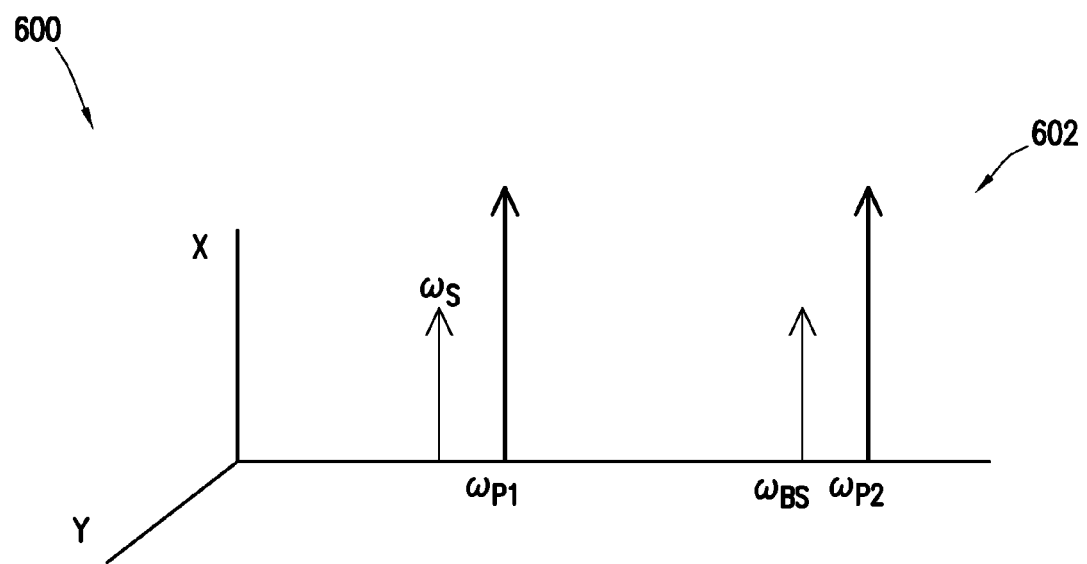
FIG. 6 illustrates a two-stage spectral inversion system including a first stage based on Bragg-scattering, a second stage based on phase conjugation, and four pump signals in accordance with one embodiment of the present disclosure.
Figure 6:
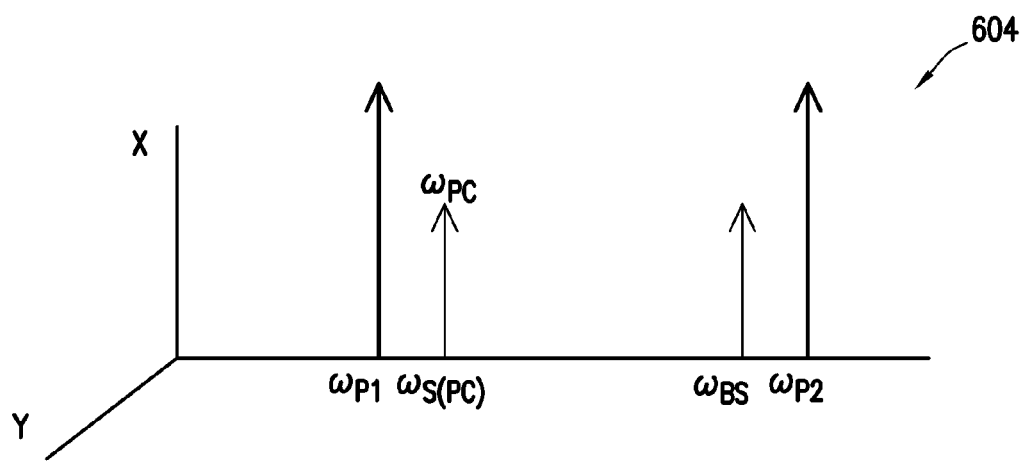

FIG. 6 illustrates two-stage spectral inversion system 600 including first stage 602 based on Bragg-scattering, second stage 604 based on phase conjugation, and four pump signals in accordance with one embodiment of the present disclosure. Two-stage spectral inversion system 600 includes first stage 602 and second stage 604. In the example of FIG. 6, first stage 602 uses Bragg-scattering, while second stage 604 uses phase conjugation. First and second stages 602 and 604 include a FWM process that takes place within one node, such as node 110 discussed with reference to FIGS. 1 and 2, which may be a NLE.

First stage 602 includes three input waves with three angular frequencies: input signal ($\omega_s$), pump one ($\omega_{P1}$), and pump two ($\omega_{P2}$). The input signal ($\omega_s$) is converted using Bragg-scattering and signals from pump one ($\omega_{P1}$) and pump two ($\omega_{P2}$). The Bragg-scattering wave $\omega_{BS}$ can be chosen by optical bandpass filter for the input signal at the second stage. Second stage 604 has as input the Bragg-scattered wave $\omega_{BS}$ that is shifted using signals from a second signal from pump one ($\omega_{P1}$) and pump two ($\omega_{P2}$) to generate phase conjugated wave, $\omega_{PC}$. The output wave is the phase conjugated wave, $\omega_{PC}$ that has the same angular frequency as the angular frequency of the original input signal ($\omega_s$) shown by $\omega_{s(PC)}$. Additional optical bandpass filter following the second stage can select the output signal of wavelength-shift-free SI at $\omega_s$. Thus, in the current example, with the use of four pump signals, the wavelength shift from spectral inversion of a signal may be eliminated. In the example of FIG. 6, the following set of equations may be followed:

First stage: $(\omega_{P1} - \omega_s = \omega_{P2} - \omega_{BS}$;

Second stage: $\omega_{PC} - \omega_{P1} = \omega_{P2} - \omega_{BS}$;

$$\omega_s = \omega_{s(PC)} = \omega_{PC}. \quad (4)$$

In some embodiments, polarization-insensitive operations may be achieved using a two-stage spectral inversion system, such as system 300, 400, 500 or 600 referencing FIG. 3, 4, 5 or 6, respectively. When using strongly birefringent fibers (SBFs), the x-axis and y-axis polarized FWM processes operate independently. To equalize the FWM gain for each polarization, the pump signal may be placed at 45 degree angles relative to the fiber principal axes of birefringence, e.g., x-axis and y-axis. Thus, a two-stage spectral inversion system may be utilized for polarization-insensitive operation with wavelength-shift-free operation for polarization multiplexed signals.

In some embodiments, a two-stage spectral inversion system may compensate for second-order dispersive effects through reduction or elimination of the wavelength shift normally associated with phase-conjugation. Because second order dispersion is cumulative, the current system becomes more advantageous as the transmission distance is increased. Additionally, use of a two-stage spectral inversion system that eliminate wavelength shift may simplify network design and management because the wavelength shift of each signal does not have be separately managed and accounted for.

Figures 7A, 7B:
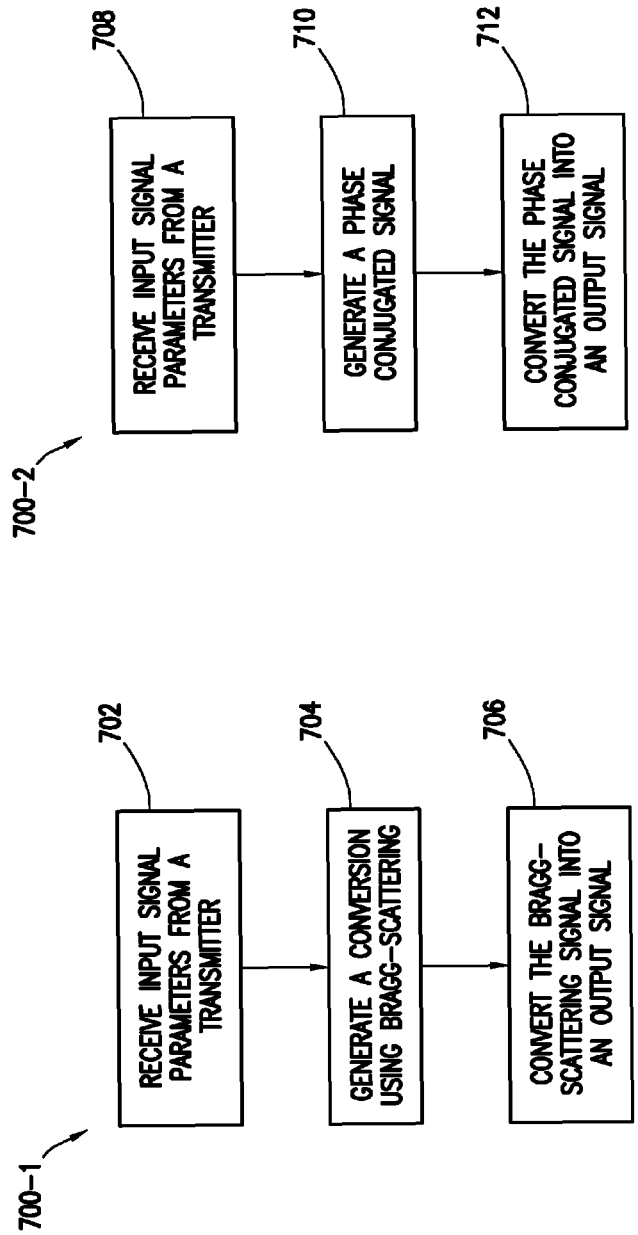
FIGS. 7A and 7B illustrate flowcharts of methods for wavelength shift elimination during spectral inversion in optical networks in accordance with some embodiments of the present disclosure.

FIGS. 7A and 7B illustrate flowcharts of methods 700-1 and 700-2 for wavelength shift elimination during spectral inversion in optical networks in accordance with some embodiments of the present disclosure. Methods 700-1 and 700-2 may be implemented fully or in part by a computing system of FIG. 8 discussed below that may be included as part of one node, such as node 110 discussed with referenced to FIG. 1. The steps of methods 700-1 and 700-2 may be performed by hardware, software, firmware or any combination thereof, configured to provide wavelength shift elimination during spectral inversion. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, methods 700-1 and 700-2 are described with respect to network 101 of FIG. 1; however, methods 700-1 and 700-2 may be used for wavelength shift elimination during spectral inversion on any suitable network. In addition, although FIGS. 7A-7B disclose a certain order of steps to be taken with respect to methods 700-1 and 700-2, the steps comprising methods 700-1 and 700-2 may be completed in any suitable order.

In method 700-1 shown in FIG. 7A at step 702, the computing system receives input signal parameters from a transmitter. For example, with reference to FIG. 3 the computing system may receive three angular frequencies: input signal ($\omega_s$), pump one ($\omega_{P1}$), and pump two ($\omega_{P2}$).

In step 704, the computing system generating a conversion using nonlinear frequency conversion, also referred to as Bragg-scattering. For example, the computing system may use a FWM process and frequency conversion to generate a Bragg-scattering signal, $\omega_{BS}$, that is not phase conjugated. The computing system may determine pump wavelengths and the center wavelengths of bandpass filters. For example, with reference to FIG. 3 and equations (1), the computing system may use signals from pump one ($\omega_{P1}$) and pump two ($\omega_{P2}$).

In step 706, the computing system converts the Bragg-scattering signal, $\omega_{BS}$, into an output signal at the same wavelength as the input signal. The computing system may convert the Bragg-scattering signal, $\omega_{BS}$, using phase conjugation and a phase conjugated signal, $\omega_{PC}$. The computing system may use the Bragg-scattering signal, $\omega_{BS}$ and apply one or more pump signals. For example, with reference to FIG. 3, the computing system may use a signal from pump three ($\omega_{P3}$) to generate the phase conjugated signal, $\omega_{PC}$. The output wave is the phase conjugated signal, $\omega_{PC}$, that is the same as the angular frequency of the original input signal ($\omega_s$) shown by $\omega_{s(PC)}$.

As another example of method 700-1 shown in FIG. 7A at step 702, the computing system receives input signal parameters from a transmitter. For example, with reference to FIG. 6 the computing system may receive three angular frequencies: input signal ($\omega_s$), pump one ($\omega_{P1}$), and pump two ($\omega_{P2}$).

In step 704, the computing system calculates a conversion using nonlinear frequency conversion, also referred to as Bragg-scattering. For example, the computing system may use a FWM process and frequency conversion to generate a Bragg-scattering signal, $\omega_{BS}$, that is not phase conjugated. The computing system may determine pump wavelengths and the center wavelengths of bandpass filters. For example, with reference to FIG. 6 and equations (4), the computing system may use signals from pump one ($\omega_{P1}$), and pump two ($\omega_{P2}$) to generate Bragg-scattering signal, $\omega_{BS}$.

In step 706, the computing system converts the Bragg-scattering signal, $\omega_{BS}$, into an output signal at the same wavelength as the input signal. The computing system may convert the Bragg-scattering signal, $\omega_{BS}$, using phase conjugation and a phase conjugated signal, $\omega_{PC}$. The computing system may use the Bragg-scattering signal, $\omega_{BS}$ and apply one or more pump signals. For example, with reference to FIG. 6, the computing system may use a second signal from pump one ($\omega_{P1}$) and a second signal from pump two ($\omega_{P2}$) to generate the phase conjugated signal, $\omega_{PC}$. The output wave is the phase conjugated signal, $\omega_{PC}$, that is the same as the angular frequency of the original input signal ($\omega_s$) shown by $\omega_{s(PC)}$.

In method 700-2 shown in FIG. 7B at step 708, the computing system receives input signal parameters from a transmitter. For example, with reference to FIG. 4 the computing system may receive three angular frequencies: input signal ($\omega_s$), pump one ($\omega_{P1}$), and pump two ($\omega_{P2}$).

In step 710, the computing system generates a phase conjugated signal, $\omega_{PC}$. The phase conjugated signal, $\omega_{PC}$ can be chosen by optical bandpass filter for the input signal at the second stage. For example, with reference to FIG. 4 and equations (2), the computing system may use signals from input signal ($\omega_s$), pump one ($\omega_{P1}$), and pump two ($\omega_{P2}$) to generate phase conjugated signal, $\omega_{PC}$.

In step 712, the computing system converts the phase conjugated signal, $\omega_{PC}$ using Bragg-scattering, into an output signal at the same wavelength as the input signal. The computing system may use signals from pump three ($\omega_{P3}$) and a second signal from pump two ($\omega_{P2}$). The output wave is the Bragg-scattering wave with angular frequency, $\omega_{BS}$, that is the same as the angular frequency of the original input signal ($\omega_s$) shown by $\omega_{s(PC)}$.

As another example of method 700-2 shown in FIG. 7B at step 708, the computing system receives input signal parameters from a transmitter. For example, with reference to FIG. 5, the computing system may receive two angular frequencies: input signal ($\omega_s$), and pump one ($\omega_{P1}$).

In step 710, the computing system generates a phase conjugated signal, $\omega_{PC}$. For example, with reference to FIG. 5 and equations (3), the computing system may use signals from pump two ($\omega_{P2}$) and a second signal from pump one ($\omega_{P1}$) to generate the phase conjugated signal, $\omega_{PC}$.

In step 712, the computing system converts the phase conjugated signal, $\omega_{PC}$ using Bragg-scattering, into an output signal at the same wavelength as the input signal. The computing system may use signals from pump two ($\omega_{P2}$) and a second signal from pump one ($\omega_{P1}$). The output wave is the Bragg-scattering wave with angular frequency, $\omega_{BS}$, that is the same as the angular frequency of the original input signal ($\omega_s$) shown by $\omega_{s(PC)}$.

Figure 8:
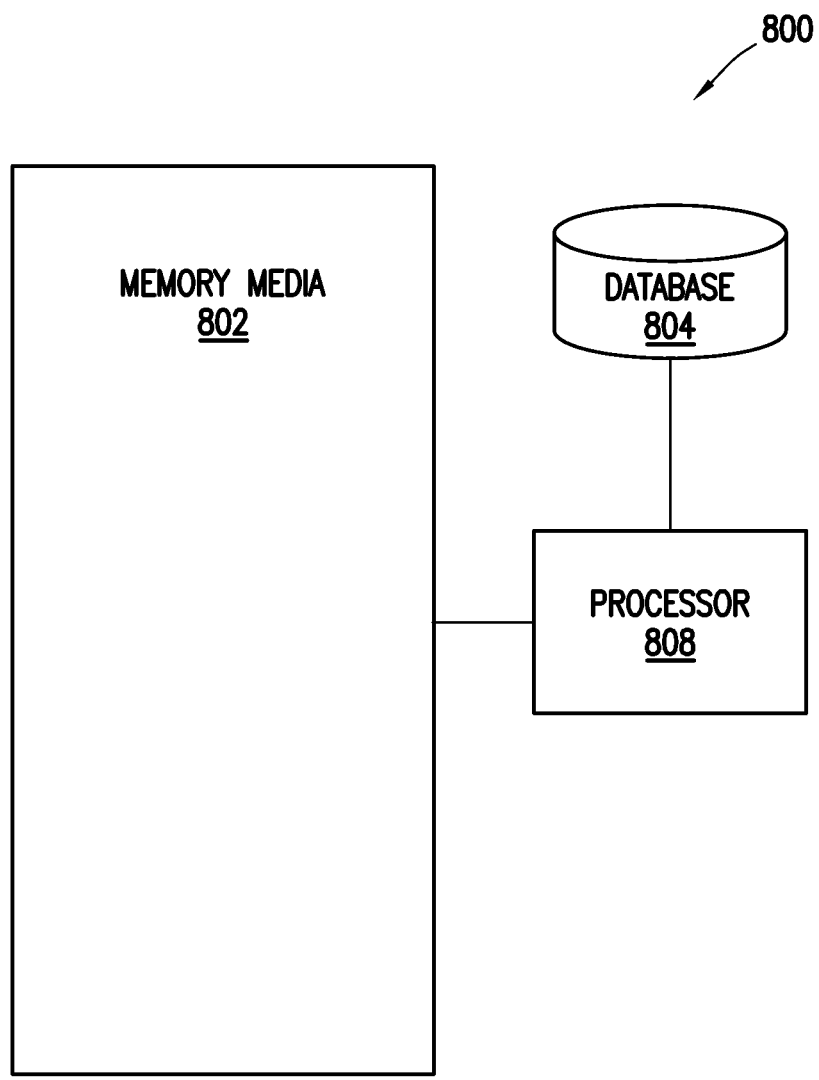
FIG. 8 illustrates a block diagram of selected elements of a computing system for wavelength shift elimination during spectral inversion in optical networks in accordance with one embodiment of the present disclosure.

FIG. 8 illustrates a block diagram of selected elements of computing system 800 for wavelength shift elimination during spectral inversion in optical networks in accordance with one embodiment of the present disclosure. Computing system 800 may execute method 700 discussed with reference to FIG. 7. Computing system 800 includes processor 808 and memory media 802, which may store executable instructions (i.e., executable code) that may be executable by processor 808, which has access to memory media 802. Processor 808 may execute instructions that cause computing system 800 to perform the functions and operations described herein. For the purposes of this disclosure, memory media 802 may include non-transitory computer-readable media that stores data and/or instructions for at least a period of time. Memory media 802 may comprise persistent and volatile media, fixed and removable media, and magnetic and semiconductor media. Memory media 802 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 802 is operable to store instructions, data, or both. Memory media 802 as shown includes sets or sequences of instructions that may represent executable computer programs and/or represent code for implementing various algorithms according to the present disclosure.

In certain embodiments, computing system 800 may be configured to interface with a person (i.e., a user) and receive data about the optical signal transmission path. For example, computing system 800 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, computing system 800 may be configured to receive data about the optical signal transmission path from a device such as another computing device and/or a network element (not shown in FIG. 2).

Database 804 may be communicatively coupled to processor 808 and may be populated with resource information to support traffic engineering, which may include link bandwidth availability. Further, database 804 may be populated with information usable to determine a network topology of an optical network, and information to determine transmission characteristics of an optical signal transmission path.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for processing an optical signal, comprising:
   receiving an input optical signal ($\omega_s$);
   generating, in a first stage of a spectral inversion system, a combined optical signal ($\omega_{BS}$) by combining, by Bragg scattering, the input optical signal ($\omega_s$) having an input wavelength with a first pump signal ($\omega_{P1}$) having a first wavelength and a second pump signal ($\omega_{P2}$) having a second wavelength, wherein $\omega_s - \omega_{P1} = \omega_{BS} - \omega_{P2}$; and
   converting, in a second stage of the spectral inversion system, the combined optical signal ($\omega_{BS}$) into an output optical signal $\omega_{s(PC)}$, by phase-conjugation, using a third pump signal ($\omega_{P3}$) having a third wavelength, wherein $2\omega_{P3} = \omega_{s(PC)} + \omega_{BS}$ and the output optical signal having the same wavelength as the input optical signal, $\omega_s = \omega_{s(PC)}$.

2. The method of claim 1, wherein the input optical signal comprises a polarization multiplexed signal.

3. A method for processing an optical signal, comprising:
   receiving an input optical signal ($\omega_s$);
   generating, in a first stage of a spectral inversion system, a combined optical signal ($\omega_{PC}$) by combining, by phase-conjugation, the input optical signal ($\omega_s$) having an input wavelength with a first pump signal ($\omega_{P1}$) having a first wavelength and a second pump signal ($\omega_{P2}$) having a second wavelength, wherein $\omega_s - \omega_{P1} = \omega_{P2} - \omega_{PC}$; and
   converting, in a second stage of the spectral inversion system, the combined optical signal ($\omega_{PC}$) into an output optical signal $\omega_{s(PC)}$, by Bragg scattering, using the second pump signal ($\omega_{P2}$) and a third pump signal ($\omega_{P3}$) having a third wavelength, wherein $\omega_{P3} - \omega_{BS} = \omega_{P2} - \omega_{PC}$ and the output optical signal having the same wavelength as the input optical signal, $\omega_s = \omega_{s(PC)} = \omega_{BS}$.

4. The method of claim 3, wherein the input optical signal comprises a polarization multiplexed signal.

5. An optical network system for processing an optical signal comprising:
   a transmitter;
   a receiver coupled to receive a signal transmitted by the transmitter;
   a transmission path coupling the transmitter and the receiver, the transmission path including a first node configured to:
   receive an input optical signal;
   generate, in a first stage of a spectral inversion system, a combined optical signal ($\omega_{BS}$) by combining, by Bragg scattering, the input optical signal ($\omega_s$) having an input wavelength with a first pump signal ($\omega_{P1}$) having a first wavelength and a second pump signal ($\omega_{P2}$) having a second wavelength, wherein $\omega_s - \omega_{P1} = \omega_{BS} - \omega_{P2}$; and
   convert, in a second stage of the spectral inversion system, the combined optical signal ($\omega_{BS}$) into an output optical signal $\omega_{s(PC)}$, by phase-conjugation, using a third pump signal ($\omega_{P3}$) having a third wavelength, wherein $2\omega_{P3} = \omega_{s(PC)} + \omega_{BS}$ and the output optical signal having the same wavelength as the input optical signal, $\omega_s = \omega_{s(PC)}$.

6. The optical network system of claim 5, wherein the input optical signal comprises a polarization multiplexed signal.

7. An optical network system for processing an optical signal comprising:
   a transmitter;
   a receiver coupled to receive a signal transmitted by the transmitter;
   a transmission path coupling the transmitter and the receiver, the transmission path including a first node configured to:
   receive an input optical signal;
   generate, in a first stage of a spectral inversion system, a combined optical signal ($\omega_{PC}$) by combining, by phase-conjugation, the input optical signal ($\omega_s$) having an input wavelength with a first pump signal ($\omega_{P1}$) having a first wavelength and a second pump signal ($\omega_{P2}$) having a second wavelength, wherein $\omega_s - \omega_{P1} = \omega_{P2} - \omega_{PC}$; and
   convert, in a second stage of the spectral inversion system, the combined optical signal ($\omega_{PC}$) into an output optical signal $\omega_{s(PC)}$, by Bragg scattering, using the second pump signal ($\omega_{P2}$) and a third pump signal ($\omega_{P3}$) having a third wavelength, wherein $\omega_{P3} - \omega_{BS} = \omega_{P2} - \omega_{PC}$ and the output optical signal having the same wavelength as the input optical signal, $\omega_s = \omega_{s(PC)} = \omega_{BS}$.

8. The optical network system of claim 7, wherein the input optical signal comprises a polarization multiplex signal.

9. A method for processing an optical signal, comprising:
   receiving an input optical signal ($\omega_s$);
   generating, in a first stage of a spectral inversion system, a combined optical signal ($\omega_{PC}$) by combining, by phase-conjugation, the input optical signal ($\omega_s$) having an input wavelength with a first pump signal ($\omega_{P1}$) having a first wavelength, wherein $2\omega_{P1}=\omega_s+\omega_{PC}$; and converting, in a second stage of the spectral inversion system, the combined optical signal ($\omega_{PC}$) into an output optical signal $\omega_{s(PC)}$, by Bragg scattering, using the first pump signal ($\omega_{P1}$) and a second pump signal ($\omega_{P2}$) having a second wavelength, wherein $\omega_{P1}-\omega_{BS}=\omega_{P2}-\omega_{PC}$ and the output optical signal having the same wavelength as the input optical signal, $\omega_S=\omega_{s(PC)}=\omega_{BS}$.

* * * * *